(12) United States Patent
Ni et al.

(10) Patent No.: US 6,729,765 B2
(45) Date of Patent: May 4, 2004

(54) RETAINED POLYMER BUSHING BEARING

(75) Inventors: Xuehai Ni, Canton, MI (US); Ed Paver, Yorkville, IL (US); John Cook, Naperville, IL (US)

(73) Assignee: Emerson Power Transmission Manufacturing, L.P., Maysville, KY (US)

( * ) Notice: Subject to any disclaimer, the term of this patent is extended or adjusted under 35 U.S.C. 154(b) by 0 days.

(21) Appl. No.: 10/054,209

(22) Filed: Nov. 13, 2001

(65) Prior Publication Data

US 2003/0091251 A1 May 15, 2003

(51) Int. Cl.[7] .............................................. F16C 33/20
(52) U.S. Cl. ....................................... 384/295; 384/906
(58) Field of Search ................................ 384/295, 296, 384/906

(56) References Cited

U.S. PATENT DOCUMENTS

| | | | | |
|---|---|---|---|---|
| 1,859,608 A | * | 5/1932 | Vigne | 384/296 |
| 2,988,405 A | * | 6/1961 | Scheldorf | 384/205 |
| 3,400,988 A | * | 9/1968 | Hudson | 384/416 |
| 4,800,057 A | * | 1/1989 | Rabe | 264/229 |
| 5,209,577 A | * | 5/1993 | Swatek | 384/97 |

FOREIGN PATENT DOCUMENTS

DE            297 01 634        * 5/1997

OTHER PUBLICATIONS

A program of Continuing Engineerng Education course on self–lubricated non–metallic bearings conducted by the University of Wisconsin, Milwaukee, Feb. 16–17, 1999.

* cited by examiner

Primary Examiner—William C. Joyce
(74) Attorney, Agent, or Firm—McDonnell Boehnen Hulbert & Berghoff LLP

(57) ABSTRACT

A bearing directed to a bushing positioned within a housing that is positively retained to prevent the bushing from moving axially with respect to the housing and that also prevents the bushing from rotating relative to the housing. The present embodiment accomplishes these goals by the use of a retention pin that positively retains the bushing within the housing.

9 Claims, 2 Drawing Sheets

(SECTION A-A)

RETAINED POLYMER BUSHING BEARING

FIELD OF THE INVENTION

This invention is directed generally to bearing assemblies, and more particularly bushing bearings.

BACKGROUND

Bearing assemblies often include various components including rolling elements that are retained within the assembly to reduce friction and wear between moving parts or surfaces. In some bearing assembly applications, a bushing is used in place of rolling elements to eliminate the necessity for the rolling elements, grease, and retainer. The bushing usually exhibits self-lubricating and shock absorbing properties allowing the bearing to run smoothly and quietly. Often the bushing is made up of a polymer such as Polytetrafluoroethylene (PTFE).

The bushing is often press-fitted inside the bearing assemblies housing, and the bushing is retained by the pressure of the press-fit. In high pressure applications, or in applications where high temperatures are experienced, the bushing will creep during its useful life and the press-fit pressure may be lost. This may result in the bushing rotating within the bearing housing. Other conditions, may also cause the bushing to undesirably rotate within the housing leading to reduced bearing or bushing life.

To prevent any relative movement between the bushing and the housing, some have attempted to use an adhesive to positively lock the bushing within the housing. However, over time and under high temperature, the adhesive has been found to degrade and the bushing may either undesirably come out of the housing, or rotate within the housing. Such methods and results are unacceptable and consequently lead to reduced bearing life and machine downtime.

Another method for retaining the bushing within the housing has been to provide a circumferential groove within the housing and to provide a corresponding bumper on the outer diameter of the bushing. Sometimes this method has been used in connection with an adhesive. In this manner, the polymer bushing is snap fit into the circumferential groove within the housing and retained within the housing. This method may prevent the bushing from moving axially with respect to the housing. However, it does not prevent the bushing from rotating, or spinning within the housing when the adhesive degrades.

Thus, there is a need in the art to provide a bushing that will remain positively retained within the housing.

SUMMARY

The present embodiment is specifically directed to a bushing positioned within a housing that is positively retained to prevent the bushing from moving axially with respect to the housing and that also prevents the bushing from rotating relative to the housing. The present embodiment utilizes a retention pin that positively retains the bushing within the housing.

In an aspect of the present embodiment, a bushing is mechanically locked within a housing to reduce movement of the bushing in axial and circumferential directions relative to the housing. In an exemplary embodiment, a bearing assembly includes at least one retention pin that mechanically locks the bushing within the bearing housing.

In another aspect of the present invention, a locking pin retains an inner ring positioned within an outer ring. The locking pin retains the inner ring from rotating in relation to the outer ring in an axial and circumferential direction. In the exemplary embodiment, the inner ring includes a polymer bushing, and the outer ring includes a housing.

The present embodiments can be utilized in bearings that may be exposed to harsh operating conditions, including subjection to high temperatures and pressure. They provide the ability to retain a bushing within a housing. Consequently, movement of the bushing is reduced in an axial and circumferential direction relative to the housing.

The foregoing and other objects, features and advantages of the bearing or bearing assembly will be apparent from the following more particular description of preferred embodiments as illustrated in the accompanying drawings.

DETAILED DESCRIPTION OF PREFERRED EMBODIMENTS

The present embodiment is illustrated in exemplary embodiments that disclose a system and device for reducing movement of a bushing in an axial and circumferential direction. More specifically, the exemplary embodiments have been implemented on a polymer bushing bearing. It should be understood that the present embodiment may be utilized on other bearing types and other bushing materials where a reduced movement of the bushing is desired. Therefore details regarding the bearing are provided as an example, and are not necessary to the invention unless otherwise specified.

Figure 1:
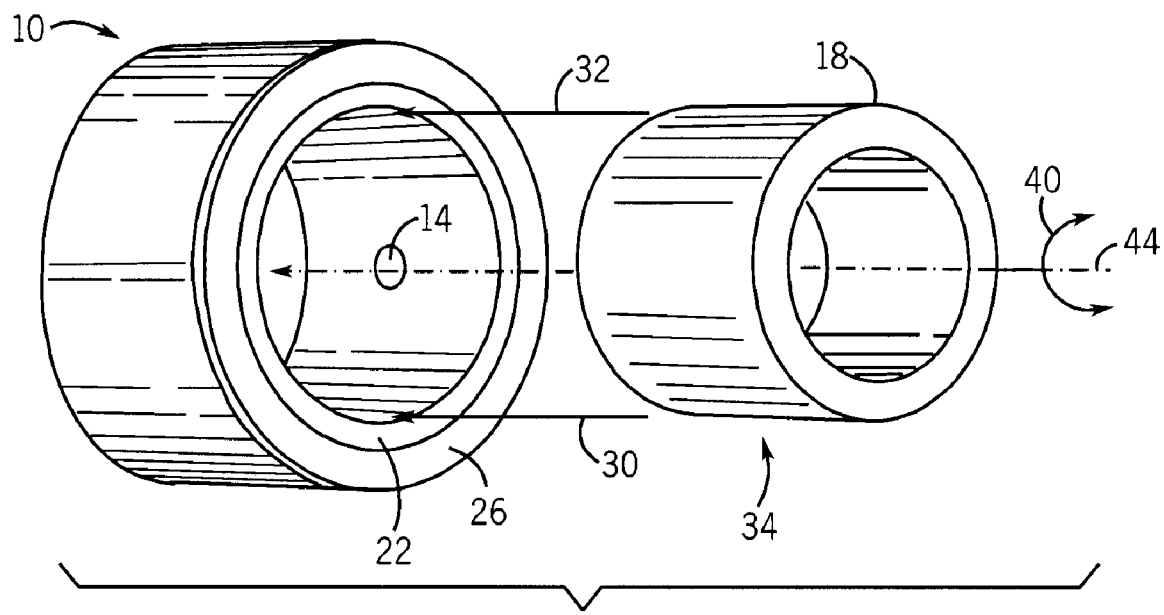
FIG. 1 is a view of an exemplary bushing bearing showing a portion of the retention pin and sleeve.

FIG. 1 illustrates an exemplary polymer bushing bearing 10 showing a portion of retention pin 14 and sleeve 18. The sleeve 18, shown outside of the bearing 10 for purposes of illustration only, is preferably positioned within the bearing 10 along arrows 30 and 32, such that the sleeve surface 34 is in contact with the polymer bushing 22. The polymer bushing 22 is positioned and retained within the bearing housing 26. The polymer bushing 22 is retained within the bearing housing 26 by retention pin 14. Note that the bearing housing 26 may be configured to accommodate any desired bearing application, and thus the bearing housing 26 should not be limited to the cylindrical configuration such as shown for clarity in FIG. 1. For example, some bearing housing configurations may be developed for fastening the bearing 10 to another device or object, accepting different types of loads, sealing out contaminants, and so forth.

The sleeve 18 is positioned within the bearing 10 such that the sleeve 18 can rotate in a circumferential direction illustrated by arrows 40 around the central bearing axis 44. In the exemplary embodiment, the sleeve 18 is a metal alloy, although other materials known in the art may be utilized. A shaft (not shown) may be positioned within and fastened to the sleeve 18 as is known in the art, such as by tightening screws, bolts, clamps, pins, welding, and so on. In an alternate embodiment, the sleeve 18 and shaft are integral to each other to eliminate the need for tightening screws or the other types of fasteners. Note that the sleeve 18 may be configured to accommodate any desired bearing application, and thus the sleeve 18 should not be limited to the cylindrical configuration such as shown for clarity in FIG. 1

In the exemplary embodiment, the bearing housing 26 is a metal alloy, although other materials known in the art may be utilized. The bearing housing 26 can be fastened or mounted to a structure or device (not shown for clarity) such that when the sleeve 18 is rotating, the bearing housing 26 and preferably the bushing 22 is prevented from rotating in the direction of the sleeve 18. To fasten the bearing housing 26 to a particular structure or device, methods known in the art such as tightening screws, bolts, clamps, pins, welding, and so on for securing the bearing housing 26 to the device may be used. In an alternate embodiment, the bearing housing 26 can rotate rather than sleeve 18 that has been fastened or mounted to a structure or device, depending on the particular bearing application.

Preferably, the retention pin 14 mechanically locks the bushing 22 to the bearing housing 26. In the exemplary embodiment, the retention pin 14 and the bushing 22 are constructed of Polytetrafluoroethylene (PTFE). According to this embodiment, the retention pin 14 is made from a material similar to the bushing 22 (e.g., PTFE), such that there is little or no additional distresses on the bushing 22. It should be understood, however, that a stronger retention pin 14 material may be used, for more demanding bearing applications.

Figure 2:
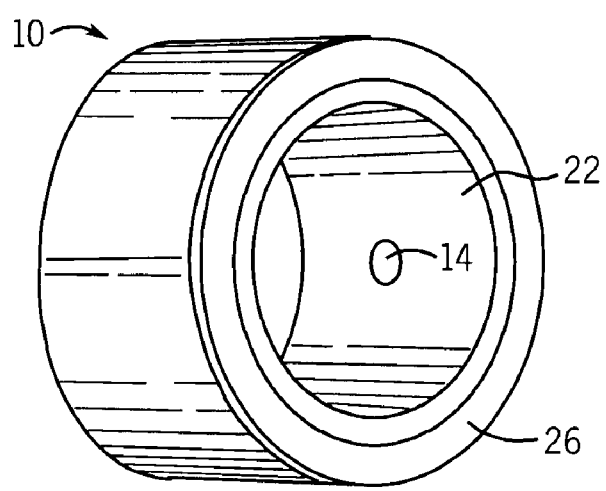
FIG. 2 is another view of the bushing bearing and retention pin of FIG. 1, without sleeve.

FIG. 2 is another view of the bushing bearing 10 and a portion of retention pin 14 of FIG. 1, however the sleeve 18 has been removed in FIG. 2 for purposes of illustration. As described above, the bushing 22 is polymer material such as PTFE, but other materials suitable for these types of bearing applications may be utilized. To retain the bushing 22 within the bearing housing 26, a retainer pin 14 may be used. Other known mechanisms for fastening or retaining the bushing 22 within the bearing housing 26 such as grooves and adhesive may be used with the retention pin 14.

Figure 3:
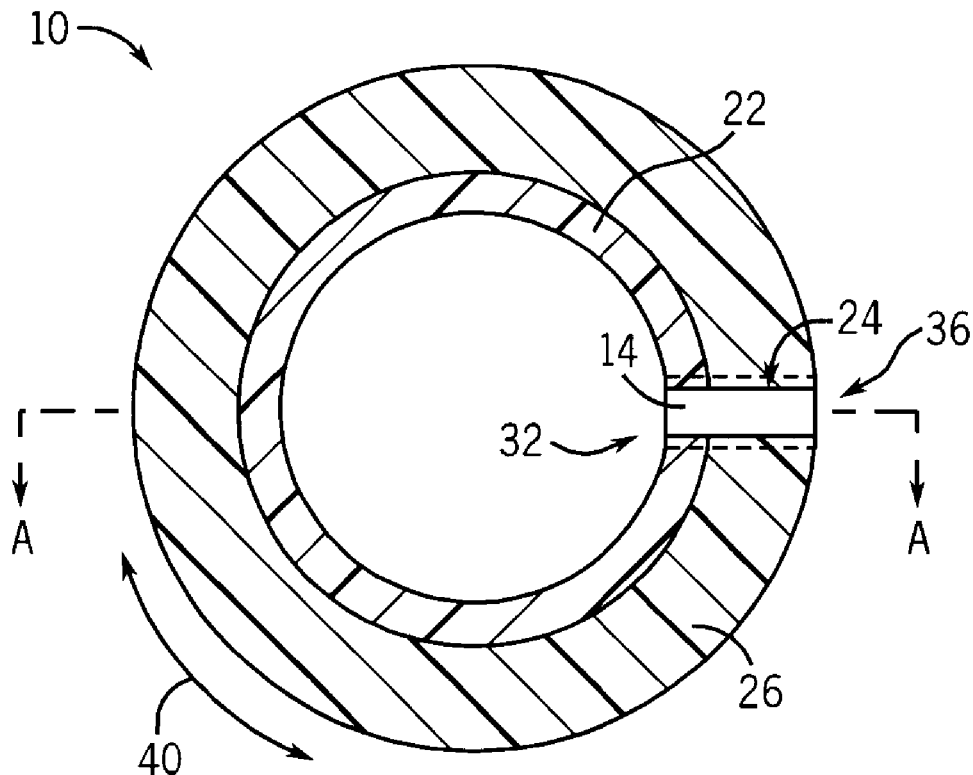
FIG. 3 is a sectional view of the bushing bearing of FIG. 1 that further illustrates the retention pin and retention pin aperture.

FIG. 3 is a sectional view of the bushing bearing 10 of FIG. 1 that further illustrates the retention pin 14 and retention pin aperture 24. Preferably, the size and configuration of the retainer pin 14 complements the corresponding retention pin aperture 24. The retainer pin 14 preferably includes a first end 32 and a second end 36. In the exemplary embodiment, the first end 32 is similar in size and configuration as the second end 36. Although it should be understood that the first end 32 and the second end 36 can be different in size and configuration, depending on the particular bearing application. Preferably, the retainer pin 14 and the corresponding aperture 24 are made with a degree of precision such that there are low tolerances for a close fit. Adhesives may be utilized to secure the retainer pin 14 in aperture 24. Moreover, the first end 32 should not project out of the bushing 22, so that a sleeve (e.g., 18 in FIG. 1) remains in close contact with the bushing 22 and not necessarily the first end 32 of the retention pin 14.

Figure 4:
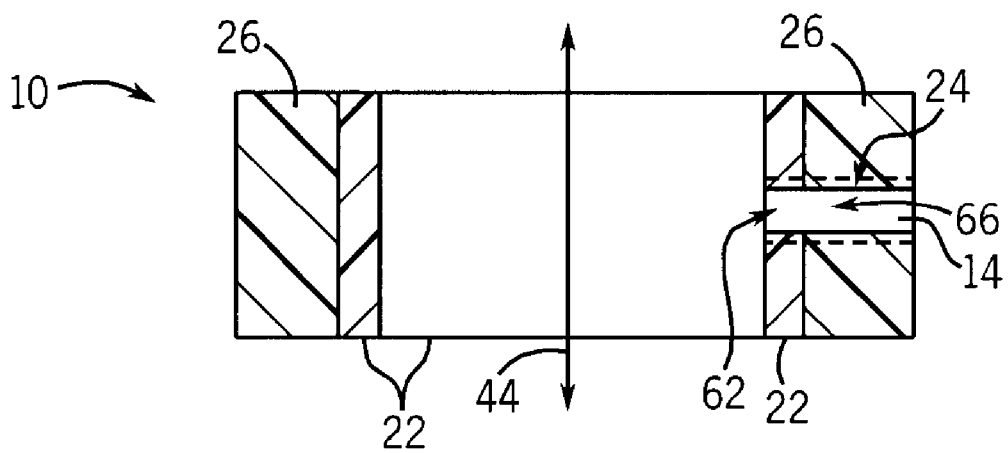
FIG. 4 is a sectional, partial view of the bushing bearing of FIG. 3 further illustrating the retention pin and retention pin aperture.

FIG. 4 is a sectional, partial view of the bushing bearing 10 of FIG. 3 further illustrating the retention pin 14 and retention pin aperture 24. FIG. 4 illustrates section A—A of FIG. 3 to show the bearing 10, retention pin 14, and retention pin aperture 24 from a different viewpoint.

Referring to FIGS. 3 and 4, the retainer pin 14 can prevent the bushing 22 from rotating in either one of the two circumferential directions 40 and in either one of the two the axial directions along central bearing axis (e.g., 44 in FIGS. 1 and 4), relative to the bushing 22. This is especially useful to prevent the bushing 22 from spinning inside of the bearing housing 26 when the sleeve is rotating and the bearing 10 is under high pressure or high temperature conditions. If desired, the retainer pin 14 can be used with other retention methods as are known in the art such as adhesive, grooves, or adhesive and grooves.

According to the exemplary embodiment, the sleeve (e.g., 18 in FIG. 1) is allowed to rotate relative to the bushing 22 in either one of the two circumferential directions. Therefore, the bushing 22 can operate as an anti-friction liner between the sleeve and bearing housing 26. Preferably, the bushing 22 remains locked in a position relative to the bearing housing 26 to prevent spinning along with the sleeve. To lock the bushing 22 in the axial and circumferential directions, the retention pin 14 is utilized. It is also possible to include more than one retention pin to retain the bushing 22 within the bearing housing 26, and may be placed anywhere inside of the bushing 22.

The retention pin 14 is fabricated from a material such as polymer and is sized and configured to the retention pin aperture 24. The retention pin 14 can be made of other materials such as metals and alloys, depending on the particular application. Stronger materials may be used for more demanding applications. Preferably, the retention pin 14 is made from a material similar to the bushing 22 to reduce any distresses that may arise on the bushing 22.

According to the exemplary embodiment, the retention pin 14 is preferably inserted into the retention pin aperture 24 after the bushing 22 is positioned within the bearing housing 26. In this embodiment, the retention pin aperture 24 includes a bushing aperture 62 and a housing aperture 66. When the bushing 22 is properly positioned within the bearing housing 26, the bushing aperture 62 and housing aperture 66 preferably align to form the retention pin aperture 24. A phantom line shows where the bushing aperture 62 and housing aperture 66 align to form the retention pin aperture 24, and where the bushing 22 and bearing housing 26 meet. The retention pin 14 may be positioned within the retention pin aperture 24. Moreover, adhesives can be utilized to reduce movement of the retention pin 14 within the retention aperture 24.

Limits and fits can be used to specify dimensions for the retention pin aperture 24 and retention pin 14. Two exemplary standards on limits and fits are described by the American National Standards Institute and are given by ANSI B4.1, B4.2, and B4.3. As is known in the art, these standards are divided into classes depending on the desired fit between the aperture and pin. Other methods known in the art can be used to specify dimensions.

In another embodiment, the retention pin 14 can be integral with the bushing 22. Therefore, upon positioning the bushing 22 within the bearing housing 26, the retention pin 14 can also be positioned with the retention pin aperture or housing aperture.

In yet another embodiment, the retention pin 14 can be integral with the bearing housing 26. When the bushing 22 is positioned within the bearing housing 26, the retention pin 14 can be positioned within the retention pin aperture or bushing aperture.

It should be understood that the processes, methods and systems described herein are not related or limited to any particular type bearing, unless indicated otherwise. Various types of general purpose or specialized bearings may be used in accordance with the teachings described herein.

In view of the wide variety of embodiments to which the principles of the present embodiments can be applied, it should be understood that the illustrated embodiments are exemplary only, and should not be taken as limiting the scope of the present invention. For example, more or fewer elements may be used in the drawings.

The claims should not be read as limited to the described order or elements unless stated to that effect. Therefore, all embodiments that come within the scope and spirit of the following claims and equivalents thereto are claimed as the invention.

What is claimed is:

1. A bearing comprising:

a housing; and a bushing positioned within the housing where the bushing has an exposed inner surface; and a retention pin bore extending through the exposed inner surface of the bushing;

wherein the bushing is locked from rotating in relation to the housing in an axial and circumferential direction by at least one retention pin, where the retention pin has a first end and a second end, and the first end extends into the housing and the second end is positioned in the bushing; wherein the retention pin and the bushing are comprised of the same polymer material.

2. The bearing of claim 1 wherein the bushing is comprised of polytetrafluoroethylene.

3. The bearing of claim 2 wherein the retention pin is comprised of polytetrafluoroethylene.

4. The bearing of claim 1 wherein the second end of the retention pin is positioned in a substantially flush relationship to the inner surface of the bushing.

5. A bearing assembly comprising:

a housing;

a bushing positioned within the housing where the bushing has an exposed inner surface;

a retention pin bore extending through the exposed inner surface of the bushing; and at least one retention pin having a first end and a second end, and the first end extends into the housing and the second end is positioned in the bushing;

wherein the retention pin mechanically retains the bushing from rotating within the housing in an axial and circumferential direction; wherein the retention pin and the bushing are comprised of the same polymer material.

6. The bearing assembly of claim 5 wherein the second end of the retention pin is positioned in a substantially flush relationship with the exposed inner surface of the bushing.

7. A retention system for a bearing, the system comprising:

an outer ring;

an inner ring positioned within the outer ring where the inner ring has an exposed inner surface;

a retention pin bore extending through the exposed surface of the inner ring;

at least one retention pin having a first end and a second end, and the first end extends into the outer ring and the second end is positioned in the inner ring;

wherein the retention pin restrains the inner ring from rotating in relation to the outer ring in an axial and circumferential direction; wherein the retention pin and the inner ring are comprised of the same polymer material.

8. The retention system of claim 7 wherein the outer ring comprises a housing.

9. The retention system of claim 7 wherein the second end of the retention pin is substantially flush with the exposed surface of the inner ring.

* * * * *